US009739655B2

(12) United States Patent
Banares et al.

(10) Patent No.: US 9,739,655 B2
(45) Date of Patent: Aug. 22, 2017

(54) SYSTEM AND METHOD FOR USING A RATE OF DECAY MEASUREMENT FOR REAL TIME MEASUREMENT AND CORRECTION OF ZERO OFFSET AND ZERO DRIFT OF A MASS FLOW CONTROLLER OR MASS FLOW METER

(71) Applicant: Illinois Tool Works Inc., Glenview, IL (US)

(72) Inventors: Berwin Banares, Glenview, IL (US);
Bill Valentine, Glenview, IL (US);
John Lull, Glenview, IL (US);
Anthony Kehoe, Glenview, IL (US);
Chris Ellec, Glenview, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 208 days.

(21) Appl. No.: 14/378,576

(22) PCT Filed: Mar. 4, 2013

(86) PCT No.: PCT/US2013/028911
§ 371 (c)(1),
(2) Date: Aug. 13, 2014

(87) PCT Pub. No.: WO2013/134148
PCT Pub. Date: Sep. 12, 2013

(65) Prior Publication Data
US 2015/0121988 A1    May 7, 2015

Related U.S. Application Data

(60) Provisional application No. 61/607,968, filed on Mar. 7, 2012.

(51) Int. Cl.
*G01F 25/00* (2006.01)
*G01F 5/00* (2006.01)
(Continued)

(52) U.S. Cl.
CPC ........ *G01F 25/0007* (2013.01); *G01F 1/6847* (2013.01); *G01F 5/00* (2013.01);
(Continued)

(58) Field of Classification Search
None
See application file for complete search history.

(56) References Cited

U.S. PATENT DOCUMENTS 5,062,446 A * 11/1991 Anderson ............ G05D 7/0635
137/468
5,911,238 A * 6/1999 Bump .................. G01F 1/6842
137/486

(Continued)

FOREIGN PATENT DOCUMENTS

GB    2 176 313 A    12/1986

OTHER PUBLICATIONS

International Search Report and Written Opinion date mailed May 2, 2013 for International PCT Application PCT/US2013/028911.

*Primary Examiner* — Jill Culler
(74) *Attorney, Agent, or Firm* — McGuireWoods LLP

(57) ABSTRACT

The disclosed embodiments include a method, apparatus, and computer program product for providing a self-validating mass flow controller or mass flow meter. For example, in one embodiment, a self-validating mass flow controller is disclosed that does not require any software modification to a tool/tool controller in which the mass flow controller is being utilized. In other embodiments, a self-validating mass flow controller is disclosed that does not require any hardware or mechanical changes to an existing mass flow controller. Still, the disclosed embodiments further include a self-validating mass flow controller that is configured to determine valve leak and sensor offset simultaneously for performing real time in-situ correction of a mass flow (Continued)

controller's output for zero offset or zero drift in the presence of valve leak.

20 Claims, 14 Drawing Sheets

(51) Int. Cl.
    *G05D 7/06*     (2006.01)
    *G01F 1/684*     (2006.01)
    *G01F 1/88*     (2006.01)

(52) U.S. Cl.
    CPC ....... *G01F 25/0053* (2013.01); *G05D 7/0635* (2013.01); *G01F 1/88* (2013.01)

(56) References Cited

U.S. PATENT DOCUMENTS

| | | | |
|---|---|---|---|
| 6,125,869 A * | 10/2000 | Horiuchi | F16K 37/0091 137/1 |
| 6,443,174 B2 * | 9/2002 | Mudd | G01F 1/6842 137/10 |
| 7,204,155 B2 * | 4/2007 | Lane | C23C 16/45557 73/861 |
| 7,881,886 B1 | 2/2011 | Shareef et al. | |
| 2005/0106080 A1 | 5/2005 | Evans et al. | |
| 2011/0011183 A1 | 1/2011 | Monkowski et al. | |
| 2011/0022334 A1 | 1/2011 | Ding et al. | |

* cited by examiner

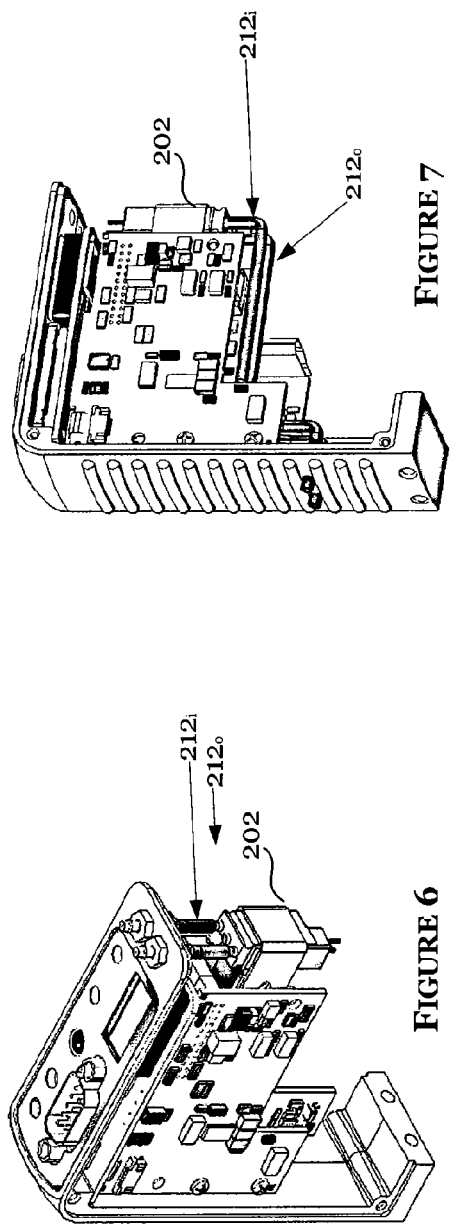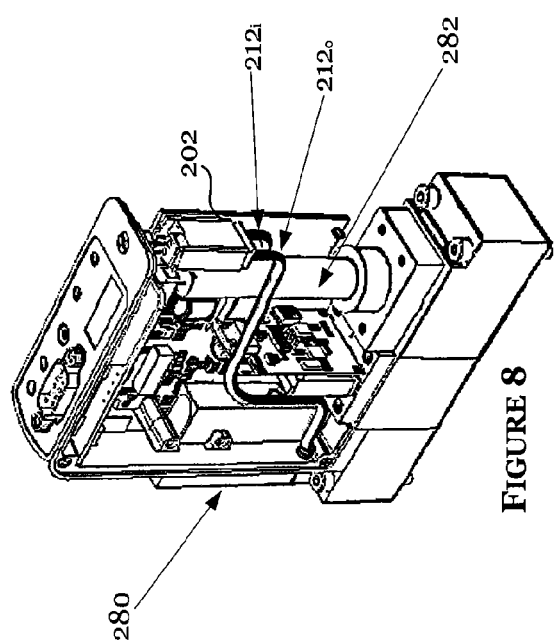
FIGURE 6
FIGURE 7
FIGURE 8

SYSTEM AND METHOD FOR USING A RATE OF DECAY MEASUREMENT FOR REAL TIME MEASUREMENT AND CORRECTION OF ZERO OFFSET AND ZERO DRIFT OF A MASS FLOW CONTROLLER OR MASS FLOW METER

BACKGROUND OF THE INVENTION

1. Field of the Invention

The present invention relates generally to methods and systems for determining the mass flow rate of a fluid, and more particularly to the operation of mass flow controllers (MFCs) and mass flow meters (MFMs).

2. Discussion of the Related Art

Many industrial processes require precise control of various process fluids. For example, in the semiconductor industries, mass flow meters (MFMs) are used to precisely measure the amount of a process fluid that is introduced to a process chamber. In addition to measuring the mass flow, mass flow controllers (MFCs) are used to precisely measure and control the amount of a process fluid that is introduced to a process chamber. It is to be understood that the term fluid as used herein applies to any type of gas or vapor to which controlled flow may be of interest.

Mass flow controllers and mass flow meters have well defined performance criteria that are guaranteed by the MFC suppliers. Customer processes are based on repeatable performances from the devices after initial installation and process tune up. Mass flow controllers and mass flow meters that drift (e.g. due to aging) or get clogged (e.g. due to contamination) will cause a loss of repeatability that causes the process characteristics to change and will lead to lower yield or even total loss of the product being manufactured. For example, as a mass flow controller ages, one cause of drift in the mass flow controller is due to an increase in valve leak.

To combat one or more of the above problems, the disclosed embodiments include a system and method for providing a self-validating mass flow controller that is configured to determine valve leak and sensor offset simultaneously. In addition, the disclosed embodiments may utilize the self-validating procedure for real time in-situ correction of a mass flow controller or mass flow meter's output for zero offset or zero drift in the presence of valve leak. This will enable the MFC or MFM to provide real time accurate information without requiring down time to make the measurements.

BRIEF SUMMARY OF THE INVENTION

The disclosed embodiments include a method, apparatus, and computer program product for providing a self-validating mass flow controller or mass flow meter. In one embodiment, a self-validating mass flow controller is disclosed that does not require any software modification to a tool/tool controller in which the mass flow controller is being utilized. In other embodiments, a self-validating mass flow controller is disclosed that does not require any hardware or mechanical changes to an existing mass flow controller. Still, the disclosed embodiments further include a self-validating mass flow controller that is configured to determine valve leak and sensor offset simultaneously for performing real time in-situ correction of a mass flow controller's output for zero offset or zero drift in the presence of valve leak.

As an example, the disclosed embodiments include a mass flow controller for controlling a flow of a fluid, the mass flow controller comprising: an inlet for receiving the fluid; a flow path in which the fluid passes through the mass flow controller; a mass flow sensor for providing a signal corresponding to mass flow of the fluid through the flow path; an adjustable valve for regulating the flow of the fluid out of an outlet of the mass flow controller; a controller configured to apply a valve control signal to adjust the adjustable valve to a desired valve position to control the flow of the fluid out of an outlet of the mass flow controller; a communication interface for communicating with a tool controller; and at least one processing component configured to execute instructions to perform an in-situ rate of decay measurement to identify valve leak issues.

As another example, the disclosed embodiments include a mass flow controller comprising an inlet for receiving the fluid from a gas delivery line having an external isolation valve upstream of the inlet; a flow path in which the fluid passes through the mass flow controller; a mass flow sensor for providing a signal corresponding to mass flow of the fluid through the flow path; an adjustable valve for regulating the flow of the fluid out of an outlet of the mass flow controller; a controller configured to apply a valve control signal to adjust the adjustable valve to a desired valve position to control the flow of the fluid out of an outlet of the mass flow controller; an internal valve configured to receive a first pneumatic line coupled to a tool pilot valve and couple a second pneumatic line from the internal valve to an external isolation valve upstream of the inlet; and at least one processing component configured to execute instructions to perform an in-situ rate of decay measurement after executing instructions to close the external isolation valve by using the internal valve to block airflow being received through the first pneumatic line.

The disclosed embodiments also include a mass flow controller for controlling a flow of a fluid, the mass flow controller comprising an inlet for receiving the fluid from a gas delivery line having an external isolation valve upstream of the inlet; a flow path in which the fluid passes through the mass flow controller; a mass flow sensor for providing a signal corresponding to mass flow of the fluid through the flow path; an adjustable valve for regulating the flow of the fluid out of an outlet of the mass flow controller; a controller configured to apply a valve control signal to adjust the adjustable valve to a desired valve position to control the flow of the fluid out of an outlet of the mass flow controller; an electrical relay configured to be couple between a first electrical line from a tool controller and a second electrical line to a tool pilot valve; and at least one processing component configured to execute instructions to perform an in-situ rate of decay measurement after executing instructions to close the external isolation valve by sending a close valve signal to the tool pilot valve via the second electrical line.

Additionally, the disclosed embodiments also include a mass flow controller for controlling a flow of a fluid, the mass flow controller comprising: an inlet for receiving the fluid from a gas delivery line having an external isolation valve upstream of the inlet; a flow path in which the fluid passes through the mass flow controller; a mass flow sensor for providing a signal corresponding to mass flow of the fluid through the flow path; an adjustable valve for regulating the flow of the fluid out of an outlet of the mass flow controller; a controller configured to apply a valve control signal to adjust the adjustable valve to a desired valve position to control the flow of the fluid out of an outlet of the mass flow controller; an electrical relay configured to be couple the external isolation valve; and at least one processing component configured to execute instructions to perform an in-situ rate of decay measurement after executing instructions to close the external isolation valve by sending a close valve signal to the external isolation valve.

Further, the disclosed embodiments also include an isolation valve that includes a first valve configured to be couple to a pneumatic line, the first valve configured to open in response to receiving air flow from the pneumatic line; and a second valve configured to receive an electrical signal, the second valve operable to block the air flow from the pneumatic line to cause the first valve to close.

Still, the disclosed embodiments also include a mass flow controller that includes an inlet for receiving the fluid; a flow path in which the fluid passes through the mass flow controller; a mass flow sensor for providing a signal corresponding to mass flow of the fluid through the flow path; an adjustable valve for regulating the flow of the fluid out of an outlet of the mass flow controller; a controller configured to apply a valve control signal to adjust the adjustable valve to a desired valve position to control the flow of the fluid out of an outlet of the mass flow controller; a communication interface for communicating with a tool controller; and at least one processing component configured to execute instructions to: perform an in-situ rate of decay measurement; determine a first valve leak value based on the rate of decay measurement; perform a flow measurement using the flow sensor while performing the in-situ rate of decay measurement; determine a second valve leak value measured by the flow sensor; determine a sensor offset correction value based on a difference between the first valve leak value and the second valve leak value; and apply the sensor offset correction value in zeroing the flow sensor.

Each of the above described mass flow controller embodiments may similarly be configured in a mass flow meter (i.e., a device that measures mass flow rates, but does not include a controller that controls the rate of flow). Additional embodiments, advantages, and novel features are set forth in the detailed description.

BRIEF DESCRIPTION OF THE DRAWINGS

Illustrative embodiments of the present invention are described in detail below with reference to the attached drawing figures, which are incorporated by reference herein and wherein:

FIGS. 6 through 8 illustrate different embodiments for implementing a self-validating mass flow controller in accordance with a disclosed embodiment.

DETAILED DESCRIPTION

The disclosed embodiments include a system, method, and apparatus for providing a self-validating mass flow controller that utilizes at least one of the disclosed self-validating procedures for providing real time in-situ correction of a mass flow controller's output to account for zero offset or zero drift. This will enable the mass flow controller to provide real time accurate information without requiring any tool down time to make the measurements.

The disclosed embodiments and advantages thereof are best understood by referring to FIGS. 1-16 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

Figure 1:
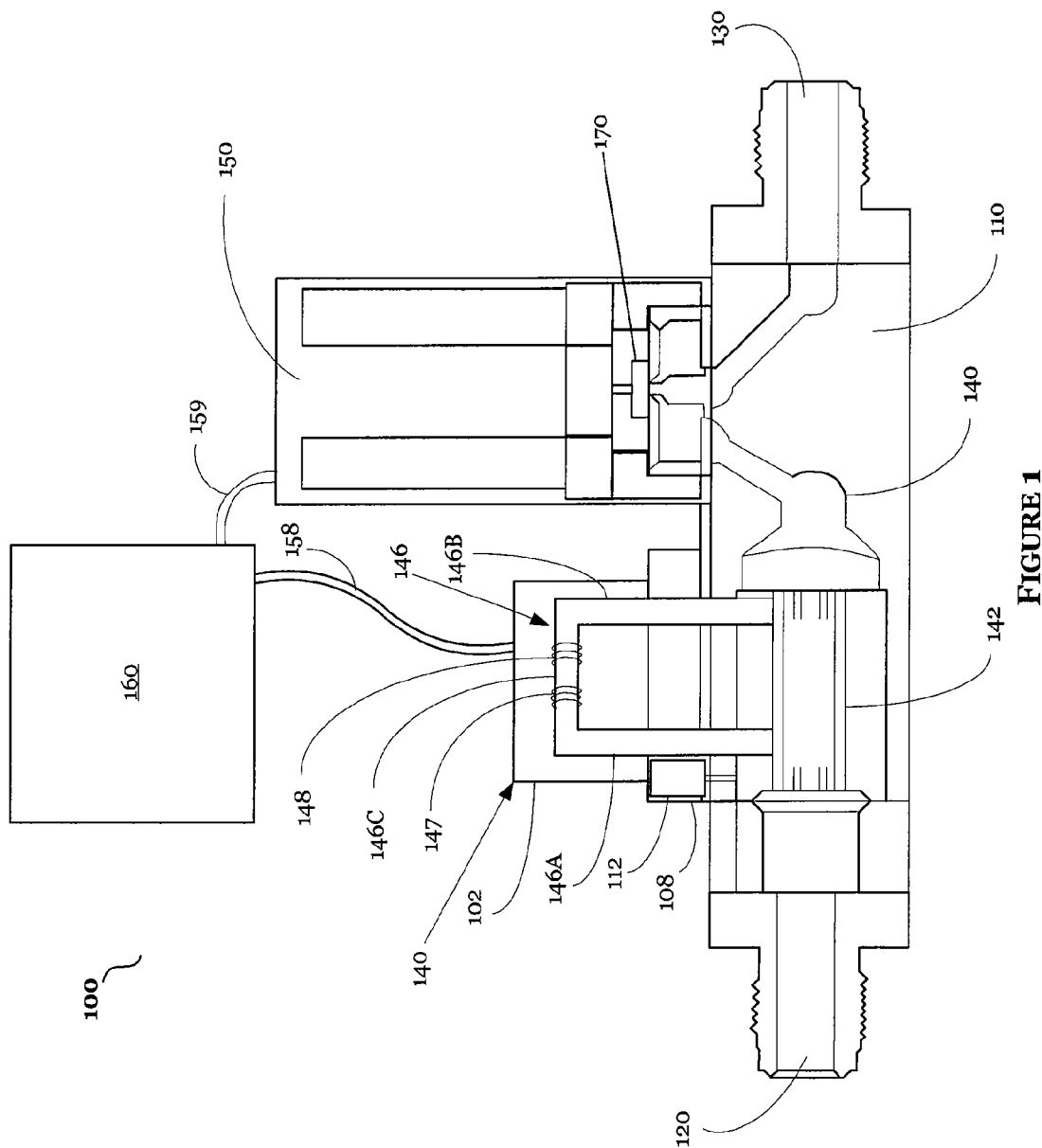
FIG. 1 illustrates components of a mass flow controller in accordance with the disclosed embodiments.

FIG. 1 shows schematically a typical mass flow controller 100 that includes a step 110, which is the platform on which the components of the MFC are mounted. A thermal mass flow meter 140 and a valve assembly 150 containing a valve 170 are mounted on the step 110 between a fluid inlet 120 and a fluid outlet 130. The thermal mass flow meter 140 includes a bypass 142 through which typically a majority of fluid flows and a thermal flow sensor 146 through which a smaller portion of the fluid flows.

Thermal flow sensor 146 is contained within a sensor housing 102 (portion shown removed to show sensor 146) mounted on a mounting plate or base 108. Sensor 146 is a small diameter tube, typically referred to as a capillary tube, with a sensor inlet portion 146A, a sensor outlet portion 146B, and a sensor measuring portion 146C about which two resistive coils or windings 147, 148 are disposed. In operation, electrical current is provided to the two resistive windings 147, 148, which are in thermal contact with the sensor measuring portion 146C. The current in the resistive windings 147, 148 heats the fluid flowing in measuring portion 146 to a temperature above that of the fluid flowing through the bypass 142. The resistance of windings 147, 148 varies with temperature. As fluid flows through the sensor conduit, heat is carried from the upstream resistor 147 toward the downstream resistor 148, with the temperature difference being proportional to the mass flow rate through the sensor.

An electrical signal related to the fluid flow through the sensor is derived from the two resistive windings 147,148. The electrical signal may be derived in a number of different ways, such as from the difference in the resistance of the resistive windings or from a difference in the amount of energy provided to each resistive winding to maintain each winding at a particular temperature. Examples of various ways in which an electrical signal correlating to the flow rate of a fluid in a thermal mass flow meter may be determined are described, for example, in commonly owned U.S. Pat. No. 6,845,659, which is hereby incorporated by reference. The electrical signals derived from the resistive windings 147,148 after signal processing comprise a sensor output signal.

The sensor output signal is correlated to mass flow in the mass flow meter so that the fluid flow can be determined when the electrical signal is measured. The sensor output signal is typically first correlated to the flow in sensor 146, which is then correlated to the mass flow in the bypass 142, so that the total flow through the flow meter can be determined and the control valve 170 can be controlled accordingly. The correlation between the sensor output signal and the fluid flow is complex and depends on a number of operating conditions including fluid species, flow rate, inlet and/or outlet pressure, temperature, etc.

The process of correlating raw sensor output to fluid flow entails tuning and/or calibrating the mass flow controller and is an expensive, labor intensive procedure, often requiring one or more skilled operators and specialized equipment. For example, the mass flow sensor may be tuned by running known amounts of a known fluid through the sensor portion and adjusting certain signal processing parameters to provide a response that accurately represents fluid flow. For example, the output may be normalized, so that a specified voltage range, such as 0 V to 5 V of the sensor output, corresponds to a flow rate range from zero to the top of the range for the sensor. The output may also be linearized, so that a change in the sensor output corresponds linearly to a change in flow rate. For example, doubling of the fluid output will cause a doubling of the electrical output if the output is linearized. The dynamic response of the sensor is determined, that is, inaccurate effects of change in pressure or flow rate that occur when the flow or pressure changes are determined so that such effects can be compensated.

A bypass may then be mounted to the sensor, and the bypass is tuned with the known fluid to determine an appropriate relationship between fluid flowing in the mass flow sensor and the fluid flowing in the bypass at various known flow rates, so that the total flow through the flow meter can be determined from the sensor output signal. In some mass flow controllers, no bypass is used, and the entire flow passes through the sensor. The mass flow sensor portion and bypass may then be mated to the control valve and control electronics portions and then tuned again, under known conditions. The responses of the control electronics and the control valve are then characterized so that the overall response of the system to a change in set point or input pressure is known, and the response can be used to control the system to provide the desired response.

When the type of fluid used by an end-user differs from that used in tuning and/or calibration, or when the operating conditions, such as inlet and outlet pressure, temperature, range of flow rates, etc., used by the end-user differ from that used in tuning and/or calibration, the operation of the mass flow controller is generally degraded. For this reason, the flow meter can be tuned or calibrated using additional fluids (termed "surrogate fluids") and or operating conditions, with any changes necessary to provide a satisfactory response being stored in a lookup table. U.S. Pat. No. 7,272,512 to Wang et al., for "Flow Sensor Signal Conversion," which is owned by the assignee of the present invention and which is hereby incorporated by reference, describes a system in which the characteristics of different gases are used to adjust the response, rather than requiring a surrogate fluid to calibrate the device for each different process fluid used.

In addition, the mass flow controller 100 may include a pressure transducer 112 coupled to flow path at some point, typically, but not limited to, upstream of the bypass 142 to measure pressure in the flow path. Pressure transducer 112 provides a pressure signal indicative of the pressure. In accordance with the disclosed embodiments, the pressure transducer 112 is used to measure pressure during a rate of decay measurement.

Control electronics 160 control the position of the control valve 170 in accordance with a set point indicating the desired mass flow rate, and an electrical flow signal from the mass flow sensor indicative of the actual mass flow rate of the fluid flowing in the sensor conduit. Traditional feedback control methods such as proportional control, integral control, proportional-integral (PI) control, derivative control, proportional-derivative (PD) control, integral-derivative (ID) control, and proportional-integral-derivative (PID) control may be used to control the flow of fluid in the mass flow controller. A control signal (e.g., a control valve drive signal) is generated based upon an error signal that is the difference between a set point signal indicative of the desired mass flow rate of the fluid and a feedback signal that is related to the actual mass flow rate sensed by the mass flow sensor. The control valve is positioned in the main fluid flow path (typically downstream of the bypass and mass flow sensor) and can be controlled (e.g., opened or closed) to vary the mass flow rate of fluid flowing through the main fluid flow path, the control being provided by the mass flow controller.

In the illustrated example, the flow rate is supplied by electrical conductors 158 to a closed loop system controller 160 as a voltage signal. The signal is amplified, processed and supplied using electrical conductors 159 to the control valve assembly 150 to modify the flow. To this end, the controller 160 compares the signal from the mass flow sensor 140 to predetermined values and adjusts the proportional valve 170 accordingly to achieve the desired flow.

Although FIG. 1 depicts that the mass flow controller 100 includes a thermal mass flow sensor, the mass flow controller 100, in accordance with the disclosed embodiments, may utilize other types of mass flow sensors including a Coriolis type sensor. An advantage of using a Coriolis-based sensor is that it is capable of determining mass flow independent of temperature, flow profile, density, viscosity, and homogeneity.

Figure 2:
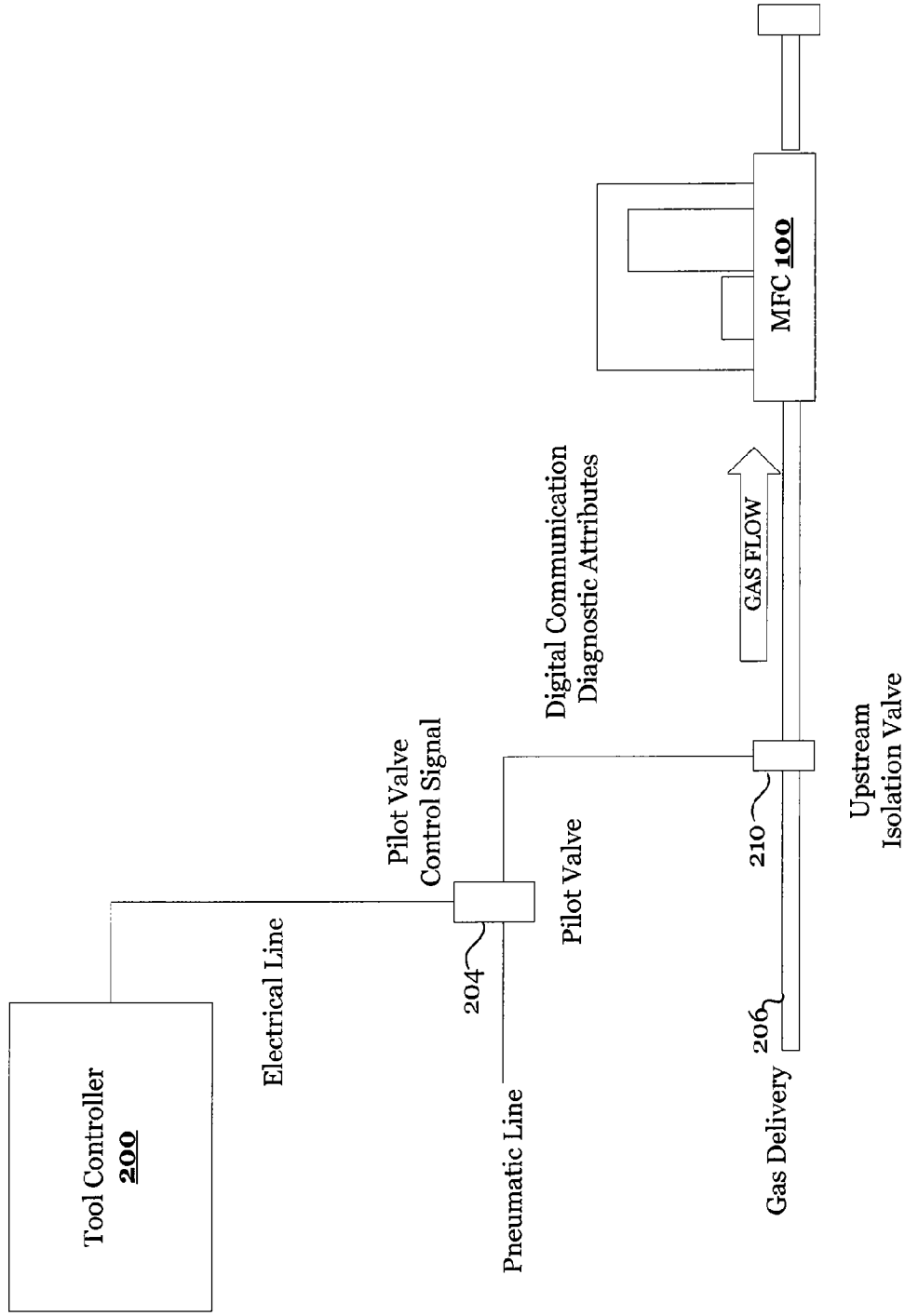
FIG. 2 illustrates an example of an environment in which a mass flow controller or a mass flow meter communicates with a tool controller in accordance with a disclosed embodiment.

FIG. 2 illustrates a block diagram depicting an embodiment for providing a self-validating mass flow controller in accordance with the disclosed embodiments. As illustrated in the depicted embodiment, the mass flow controller 100 is installed on a tool that includes a tool controller 200 that controls delivery of gas to the mass flow controller via a gas delivery line 206. An isolation valve 210 is located upstream of the mass flow controller 100 on the gas delivery line 206. The isolation valve 210 is communicatively coupled to a pilot valve 204, which is controlled by the tool controller 200. The isolation valve 210 is typically a normally closed valve. When the tool pilot valve 204 is open, compressed air actuates the isolation valve 210 to open. When the tool pilot valve 204 is closed, no air is supplied, causing the isolation valve 210 to close, thereby shutting the gas supply to the mass flow controller 100.

Therefore, in accordance with the disclosed embodiments, in order to interrupt the delivery of gas to the mass flow controller 100, the mass flow controller 100 may be configured with a software protocol to communicate with the tool controller 200 to have the tool controller issue a pilot valve control signal to close the tool pilot valve 204, which in turn causes the upstream isolation valve 210 to close, thereby shutting the gas supply to the mass flow controller 100 for enabling the mass flow controller 100 to perform an in-situ rate of decay measurement for self-detecting any performance loss.

Figure 3:
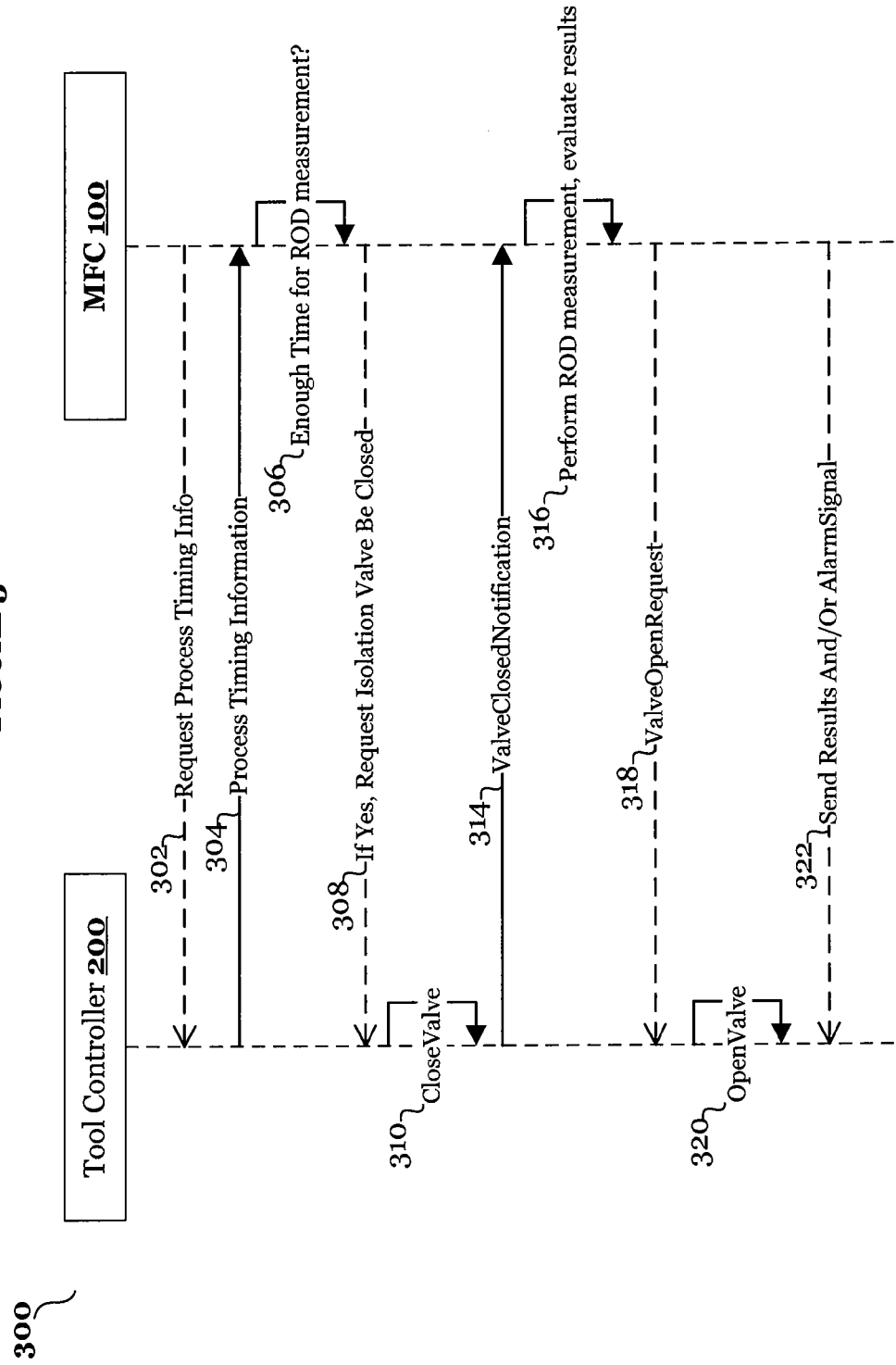
FIG. 3 illustrates an example of a sequence diagram depicting a software protocol for performing a rate of decay measurement in accordance with one embodiment.

For example, FIG. 3 illustrates a sequence diagram 300 depicting a software protocol 300 for performing a rate of decay measurement in accordance with the disclosed embodiment. The software protocol 300 may be implemented in a controller or control electronics of a mass flow controller as described in FIG. 1. For example, the software protocol may be executed using one or more processors of the mass flow controller. Additionally, the tool controller would be modified to execute instructions related to the software protocol for exchanging data and commands with the mass flow controller.

In the depicted embodiment, the mass flow controller 100 requests process timing information from the tool controller 200 (step 302). This request may be performed at a predetermined time and/or occur repeatedly at prespecified time intervals. In response to the process timing information request, the tool controller 200 returns the process timing information data to the mass flow controller 100 (step 304). In an alternative embodiment, the tool controller 200 may be configured to automatically push the process timing information data to the mass flow controller 100 without having to first receive a request.

Using the process timing information, the mass flow controller 100 identifies processing time intervals in which the mass flow controller 100 is able to complete a rate of decay measurement (step 306). For example, the mass flow controller 100 may be configured to execute pattern recognition instructions to recognize certain patterns in the processing time information that enables the mass flow controller 100 to identify certain process time intervals in which a rate of decay measurement may be completed without interruptions. The mass flow controller may execute an algorithm for determining a time needed to complete a rate of decay measurement using such factors as a type of gas and setpoint being applied to the mass flow controller.

In response to identifying a processing time interval in which the mass flow controller 100 is able to complete a rate of decay measurement, the mass flow controller 100 issues a request to the tool controller 200 to close the isolation valve 210 (step 308). The tool controller 200 issues a pilot valve control signal to close the tool pilot valve 204, which in turn causes the upstream isolation valve 210 to close (step 310). The tool controller 200 then transmits a status acknowledgement to the mass flow controller 100 indicating that the isolation valve is closed (step 314). The mass flow controller 100 initiates and evaluates the results of a rate of decay measurement (step 316). After performing the rate of decay measurement and verifying the results, the mass flow controller 100 transmits a request to the tool controller 200 to re-open the isolation valve (step 318). In certain embodiments, the mass flow controller 100 may also transmit the results to the tool controller 200 and/or may be configured to raise an alarm when its internal rate of decay measurement shows that the characteristics of the device have changed by a certain amount in a given period of time (step 322). For example, the accuracy at a given setpoint has shifted by more than 2% over a 2 week period. In an alternative embodiment, the sending of the results and/or the signal may replace the need for sending a valve reopening request (i.e., step 318).

Figure 4:
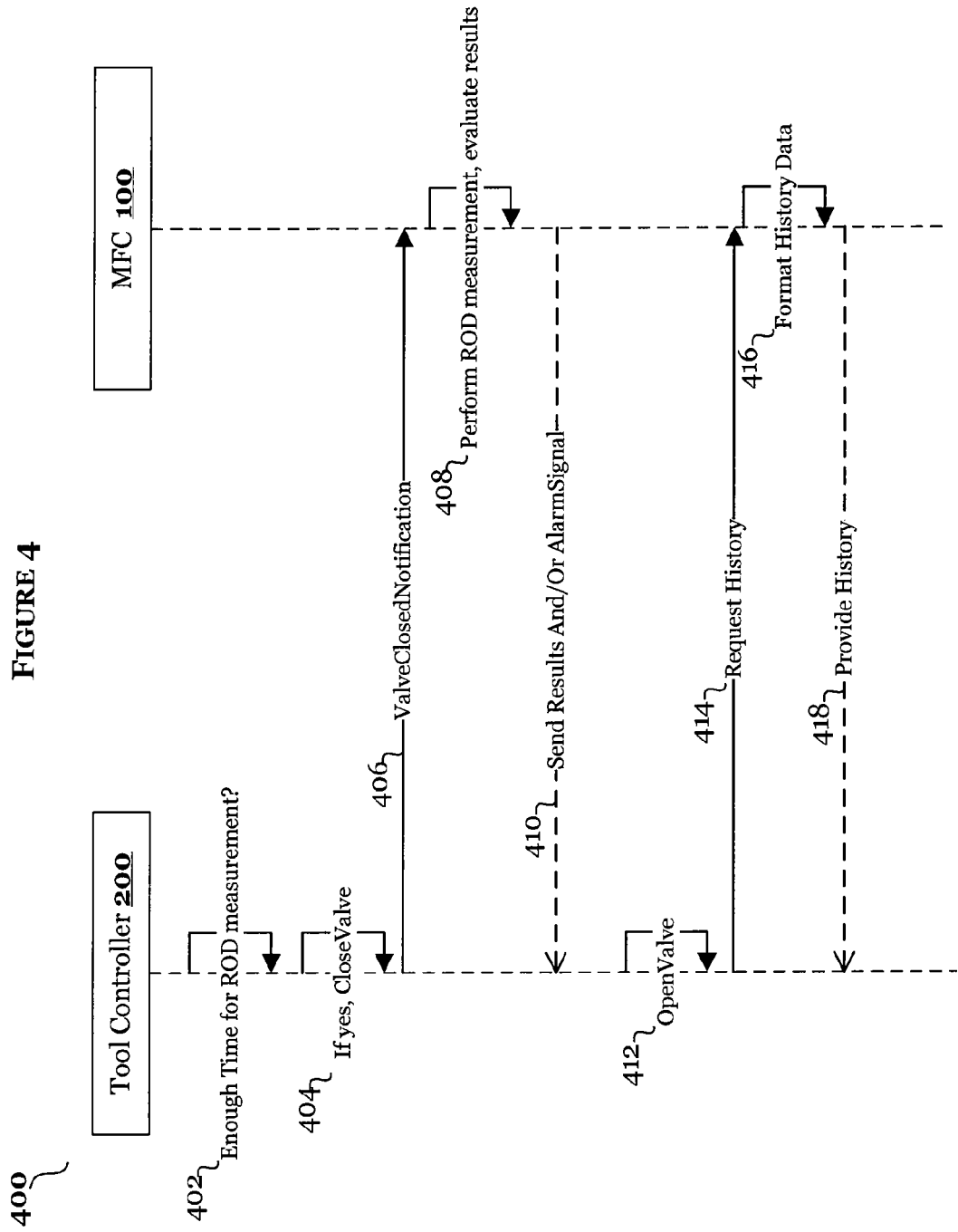
FIG. 4 illustrates an example of a sequence diagram depicting a second software protocol for performing a rate of decay measurement in accordance with another embodiment.

FIG. 4 illustrates another example of a software protocol between the mass flow controller 100 and the tool controller 200 for making a rate of decay measurement to check for valve leak in accordance with the disclosed embodiments. In this embodiment, the tool controller 200 could be configured to execute instructions to identify processing time intervals in which the mass flow controller 100 is able to complete a rate of decay measurement (step 402). In response to identifying a processing time interval in which the mass flow controller 100 is able to complete a rate of decay measurement, the tool controller 200 may simply initiate the gas supply interruption by causing the upstream isolation valve 210 to close (step 404). The tool controller 200 then informs the mass flow controller 100 the status of the isolation valve 210 (step 406). In response to receiving the isolation valve status, the mass flow controller 100 performs and evaluates the results of a rate of decay measurement (step 408). In this embodiment, after evaluating the results, the mass flow controller 100 sends the results of the rate of decay measurement and/or an alarm signal to the tool controller 200 indicating the mass flow controller 100 is done performing the rate of decay measurement (step 410). Based on the received results, the tool controller 200 may then issue a signal to re-open the isolation valve 210 (step 412).

In addition, in certain embodiments, the tool controller 200 may also request history information from the mass flow controller 100 (step 414). The mass flow controller 100 responds by formatting the history data (step 416) and providing the history data to the tool controller 200 (step 418).

Accordingly, as described above, advantages of the disclosed embodiments include, but are not limited to, a system and method for providing a self-validating mass flow controller that uses one or more processors to execute instructions associated with one or more software protocols to eliminate the requirement of having a separate device installed on the tool to perform the rate of decay measurement for checking valve leak and/or for requiring that the rate of decay measurement be performed off-line. In addition, the disclosed embodiments do not require any hardware or mechanical changes to an existing mass flow controller.

As an alternative to the software protocol implementations described above, FIGS. 5-10 depict embodiments for implementing a self-validating mass flow controller that does not require any software or hardware changes to the tool, but instead utilizes different hardware modifications to the mass flow controller.

Figure 5:
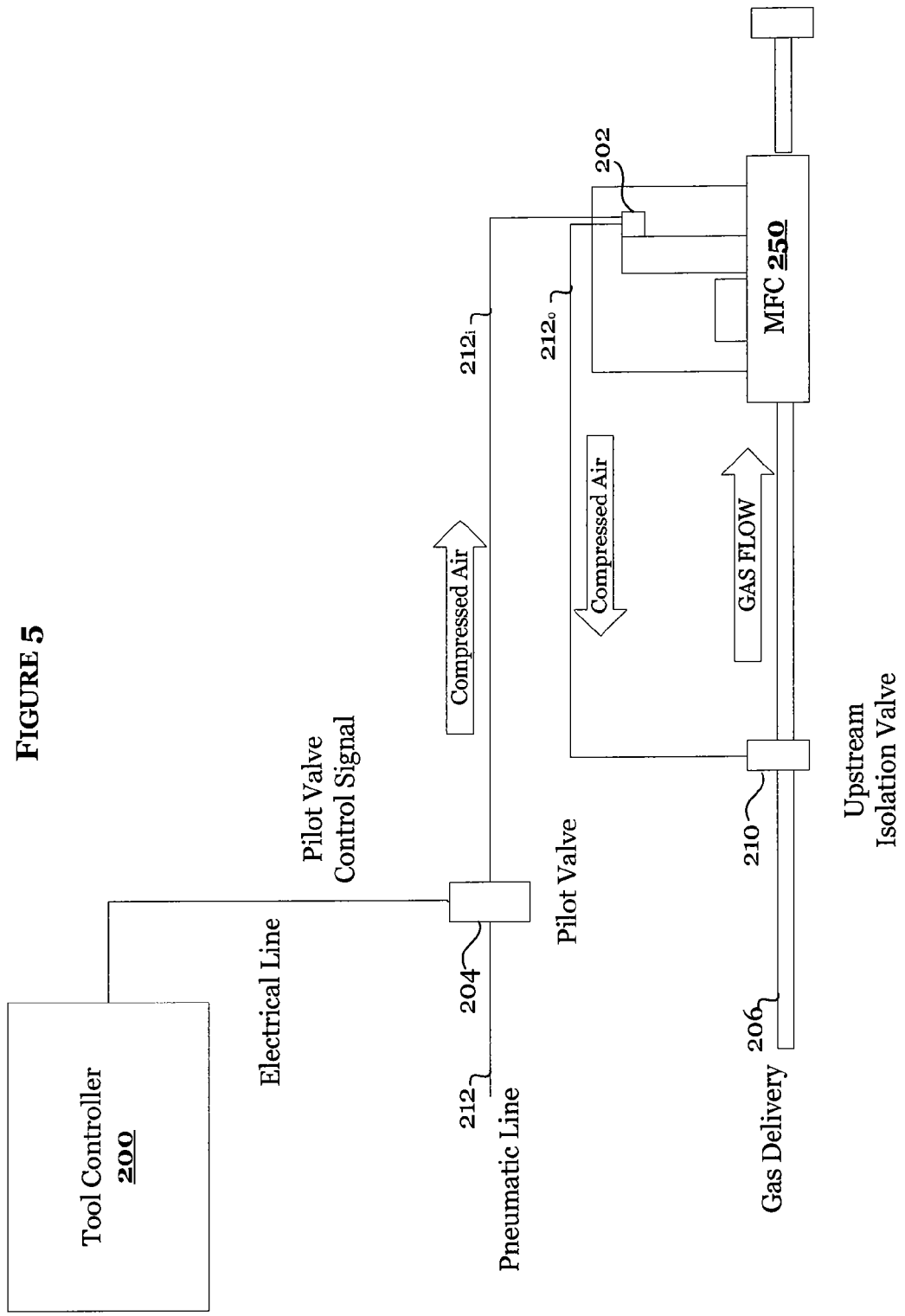
FIG. 5 is a block diagram illustrating an embodiment for providing self-validating mass flow controller in accordance with the disclosed embodiments.

For example, FIG. 5 discloses a first embodiment for providing a self-validating mass flow controller using a hardware modification to the mass flow controller. In contrast to FIG. 2, in this embodiment, in order to interrupt the gas supply from the gas delivery line 206, the pneumatic supply line 212 is re-routed through the tool pilot valve 204 to a mass flow controller 250 using connections supplied with the device. The mass flow controller 250 is a modified version of the mass flow controller 100 shown in FIG. 1. The mass flow controller 250 is modified to include an internal valve 202 that is configured to be in series with the tool pilot valve 204. In the depicted embodiment, the isolation valve 210 is externally located upstream of the mass flow controller 250 on the gas delivery line 206. However, in certain embodiments, the isolation valve 210 may be incorporated internally within the mass flow controller 250. Again, the isolation valve 210 is typically a normally closed valve that only opens when compressed air is provided to actuate the isolation valve 210 to open.

Utilizing the disclosed configuration in FIG. 5, it can be seen that the mass flow controller 250 using the internal valve 202 can only interrupt the compressed air when the tool controller 200 supplies it (i.e., when the tool controller opens the pilot valve 204). Thus, in this embodiment, the mass flow controller 250 cannot open the isolation valve 210 if the tool controller 200 does not supply the compressed air. However, utilizing this configuration, the mass flow controller 250 is configured to be able to close the internal valve 202, thereby blocking the compressed air supply which in turn closes the isolation valve 210 to shut off the gas supply to the mass flow controller 250. Once closed, the mass flow controller 250 is configured to initiate and perform a rate of decay measurement. After performing the rate of decay measurement and verifying the results, the mass flow controller 250 may re-open the internal valve 210, thereby, opening the isolation valve 222 to enable gas supply to the mass flow controller 250.

FIGS. 6 through 8 illustrate different embodiments for implementing the mass flow controller 250 as described in FIG. 5. For example, FIG. 6 illustrates a mass flow controller 250 that includes an internal valve 202 that is configured to be in series with the tool pilot valve 204. The internal valve 202 receives a first pneumatic line 212*i* from the tool pilot valve 204 and routes a second pneumatic line 212*o* to the isolation valve 210. As can be seen in the illustration, the first and second pneumatic lines are routed through an opening on a top surface of the mass flow controller. However, FIG. 7 illustrates a different embodiment in which the first and second pneumatic lines are routed in and out of the mass flow controller through openings located on a side of the mass flow controller. Further, FIG. 8 illustrates another embodiment in which the first and second pneumatic lines are routed through a mass flow controller having a modified inlet block 280 and a piezo valve 282.

The embodiments depicted in FIGS. 6 through 8 are provided merely as illustrative examples and are not intended to limit the numerous ways of implementing the mass flow controller 250. For instance, while the internal valve 202 is depicted as being in a specific location in each of the illustrated embodiments, the internal valve 202 may be incorporated elsewhere within the mass flow controller 250. Additionally, the openings in the mass flow controller for routing the first and second pneumatic lines may be located in any number of locations on the mass flow controller.

Figure 9:
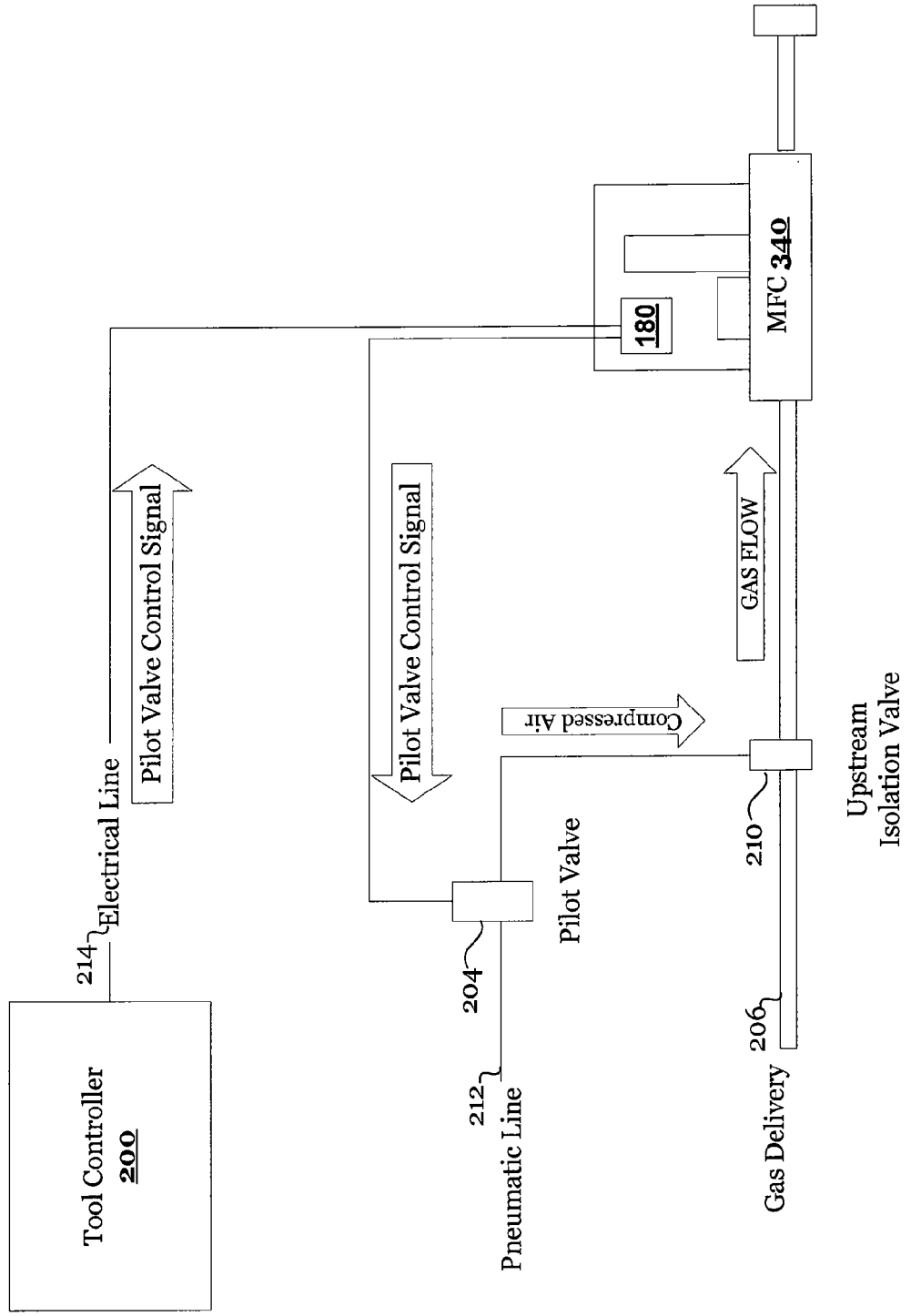
FIG. 9 is a block diagram illustrating a second embodiment for providing self-validating mass flow controller in accordance with the disclosed embodiments.
Figure 10:
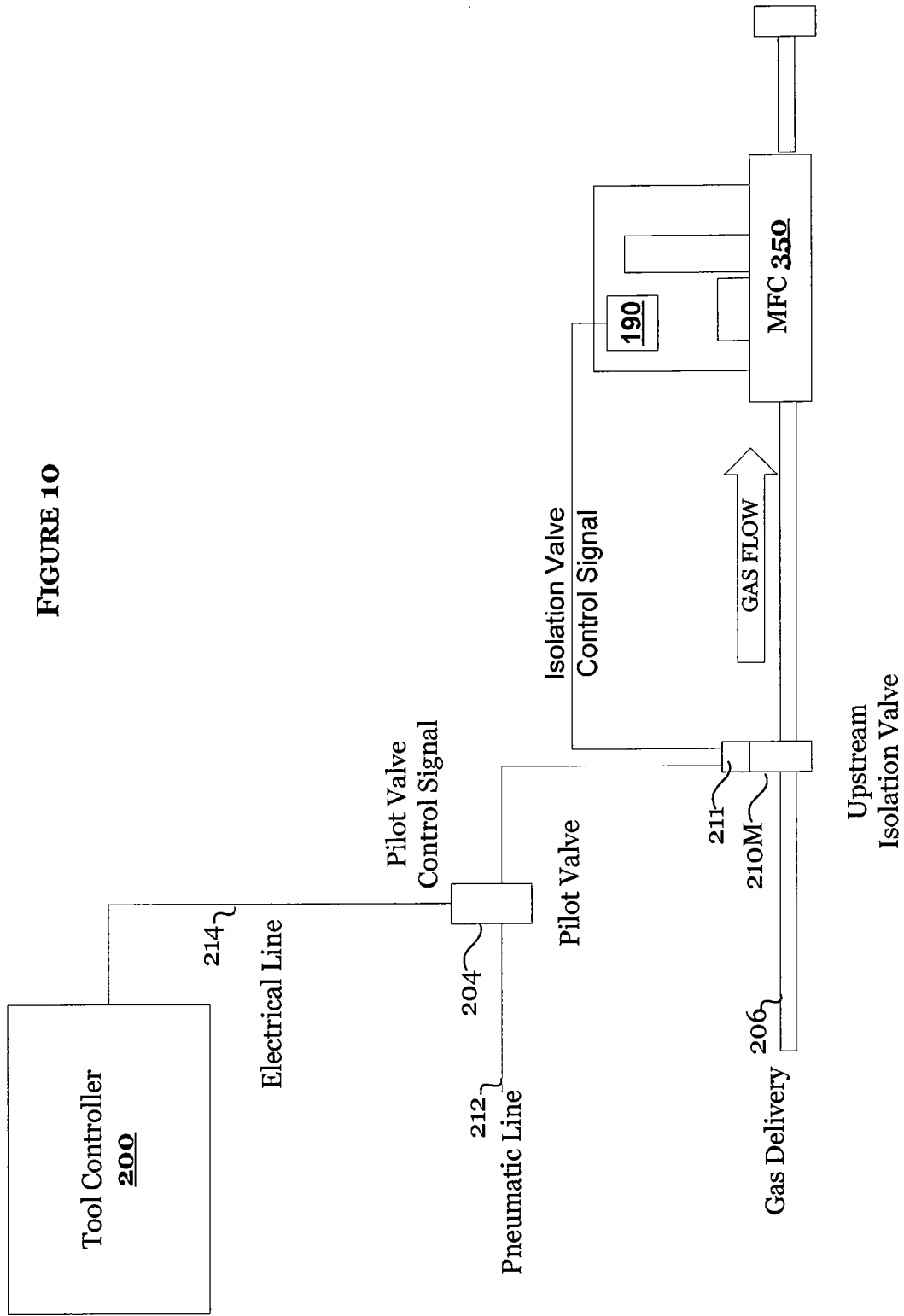
FIG. 10 is a block diagram illustrating a third embodiment for providing self-validating mass flow controller in accordance with the disclosed embodiments.

In contrast to FIG. 5, FIGS. 9 and 10 depict alternative embodiments for providing a self-validating mass flow controller that do not include an internal valve 202. Instead, mass flow controllers 340 and 350, respectively depicted in FIGS. 9 and 10, include additional or modified electrical components for enabling the mass flow controllers to transmit a signal that causes the closing of the isolation valve 210. For instance, in regard to FIG. 9, the mass flow controller 340 is configured to include an electrical relay 180 that is in series with the electrical line 214 for controlling the tool pilot valve 204. The electrical relay 180 may be an electrical component of or be controlled by the control electronics 160 of the mass flow controller 340.

In one embodiment, the mass flow controller 340 is configured to be able to send a pilot valve control signal to close the isolation valve 210 for performing a rate of decay measurement during a period when the isolation valve 210 was previously opened by the tool controller 200. After performing the rate of decay measurement and verifying the results, the mass flow controller 340 may send a second pilot valve control signal to re-open the isolation valve 222 to enable gas supply to the mass flow controller 340. In a preferred embodiment, the mass flow controller 340 is configured to not be able to open the isolation valve 210 when the tool controller 200 closes it. An advantage to the embodiment disclosed in FIG. 9 to that of FIG. 3 is that the cost to produce the mass flow controller 340 would be less than that of the mass flow controller 250 as the mass flow controller 340 does not require an additional internal valve component. However, a disadvantage is that it would increase the requirements on the tool wiring.

FIG. 10 presents another embodiment of a mass flow controller 350 that includes an electrical component 190 that is configured to enable the mass flow controller 350 to transmit a signal to an isolation valve 210M that causes the closing of the isolation valve 210M. The isolation valve 210M is a modified version of a typical isolation valve. The isolation valve 210M would include added components for receiving an isolation valve control signal from the mass flow controller 350 and an additional valve 211 that would be able to block the compressed air being received by the pneumatic line 212 in response to receiving the isolation valve control signal from the mass flow controller 350, which in turn causes the isolation valve 210M to close, thereby preventing the flow of gas to the mass flow controller 350 for enabling the mass flow controller 350 to perform a rate of decay measurement. In one embodiment, the valve 211 is a solenoid valve. Additionally, in certain embodiments, the valve 211 may be a separate component (e.g., a cap) that is configurable to be coupled to existing isolation valves.

As described above, each of the disclosed mass flow controller embodiments (mass flow controller 100, 250, 340, and 350) can now control when the isolation valve 210 is closed or open while the process is running based on its own requirement for making the rate of decay measurement. In addition, the mass flow controllers may be programmed to determine a time necessary for completing a rate of decay measurement, analyze patterns in the processing time to identify processing time segments that would allow the mass flow controller to complete the rate of decay measurement without interfering with the tool process (i.e., the tool does not have to go offline), evaluate the results of a rate of decay measurement, and raise an alarm if its internal rate of decay measurement shows that the characteristics of the mass flow controller have changed by a certain amount in a given period of time. For example, the accuracy at a given setpoint has shifted by more than 2% over a 2 week period. Thus, the disclosed embodiment provides a self-validating mass flow controller that is able to provide real time information without requiring down time to make the measurements.

Further, in certain embodiments, the disclosed mass flow controllers may be configured to self-correct its calibration and offset based on the rate of decay measurement described above. For instance, once valve leak is determined based on the rate of decay measurement, the MFC may be zeroed to adjust for the determined valve leak.

Zeroing an MFC on tool is a very delicate operation that requires many parameters to be exactly right in order to provide a correct zero for the device's operations. For instance, the status of the isolation valves, the inlet pressure, the orientation, and other parameters all affect the sensor reading at zero flow. Zeroing the device incorrectly will result in the actual flow during the device being incorrect, with greater effect the lower the required flow. For example, a zero error of 0.01% FS will result in a 1% of setpoint error at 1% of full scale setpoint. As the customers require greater and greater turn down ratio (i.e. lower minimum setpoint going from 10% to 2.5% to 0.5% of full scale), this effects keeps getting greater.

Current solutions to the problem are to either not zero the unit at all and simply replace the device when the zero has drifted too much or has become too complex to follow procedures such as purging, sequencing the isolation valves and setpoint in a controlled manner, etc. The former leads to down time and costs to the customer and the supplier, along with excessive replacement of units that could otherwise still be used if a zero correction could be applied. The latter is still error prone and leads to devices being zeroed incorrectly and making the situation worse, leading to more device replacement.

Accordingly, a purpose of the disclosed embodiments is to use a repeatable, controlled method of measuring valve leak such as, but not limited to, the self-validating rate of decay methods and apparatus described above to compare the measurement to the value reported by the flow sensor, and correcting the difference to provide an accurate zero value to the flow sensor.

In current mass flow controllers, the calculated flow in the device is as follows:

calculated_flow=inherent sensor offset+last zero correction+valve leak measured by the sensor. (Equation 1)

If the sensor has been zeroed properly, last zero correction will cancel inherent sensor offset, and the calculated_flow is the valve leak. The problem is that there is no guarantee that the valve leak was zero when the device was zeroed. Thus, there is no guarantee that that the inherent sensor offset was completely corrected by the last zero correction because although the calculated_flow is determined, the individual terms on the right of equation 1 (i.e., inherent sensor offset, last zero correction, and valve leak measured by the sensor) cannot be differentiated.

Figure 11:
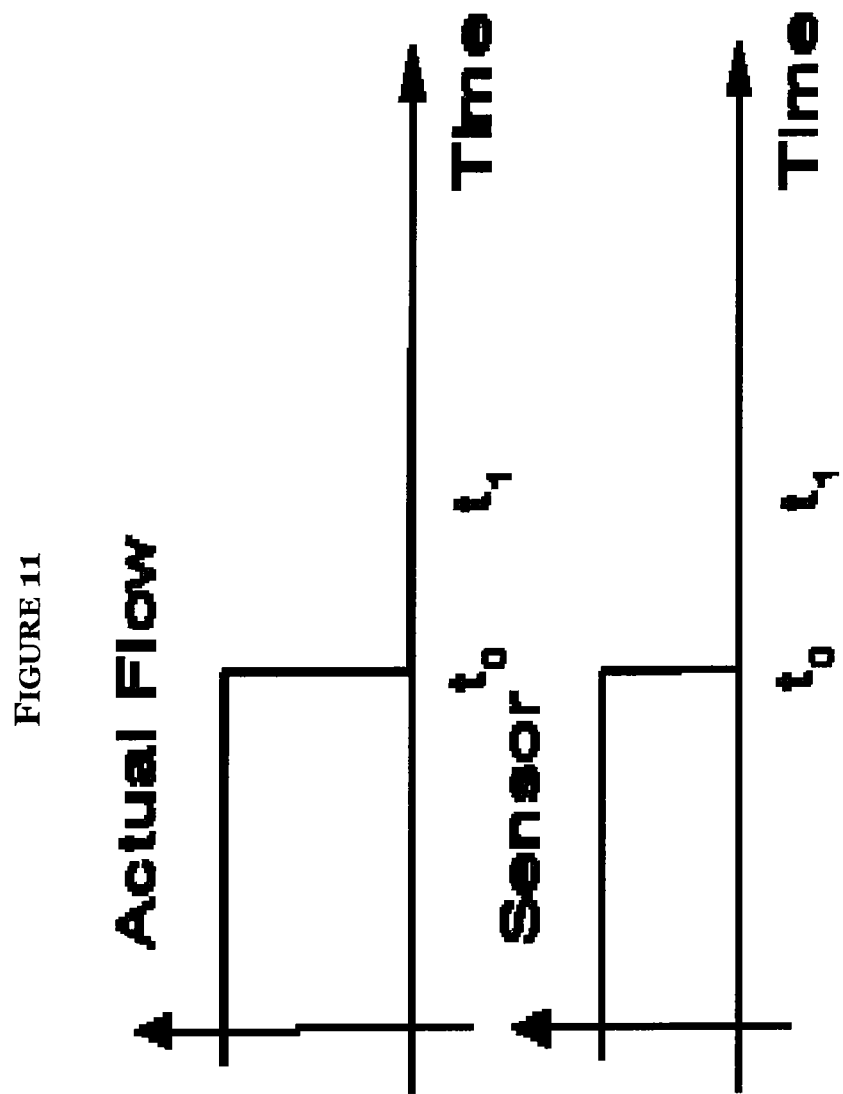
FIG. 11 illustrates a graph depicting an ideal situation between the sensor and the actual flow.

For example, reference is made to FIG. 11, which illustrates a graph depicting the ideal situation between the sensor and the actual flow. In the depicted graph, at time to, the device is sent a zero setpoint, the control valve closes and the flow output becomes zero. The device is zeroed at instant t1, the flow reading is zero and the sensor output is zero.

Figure 12:
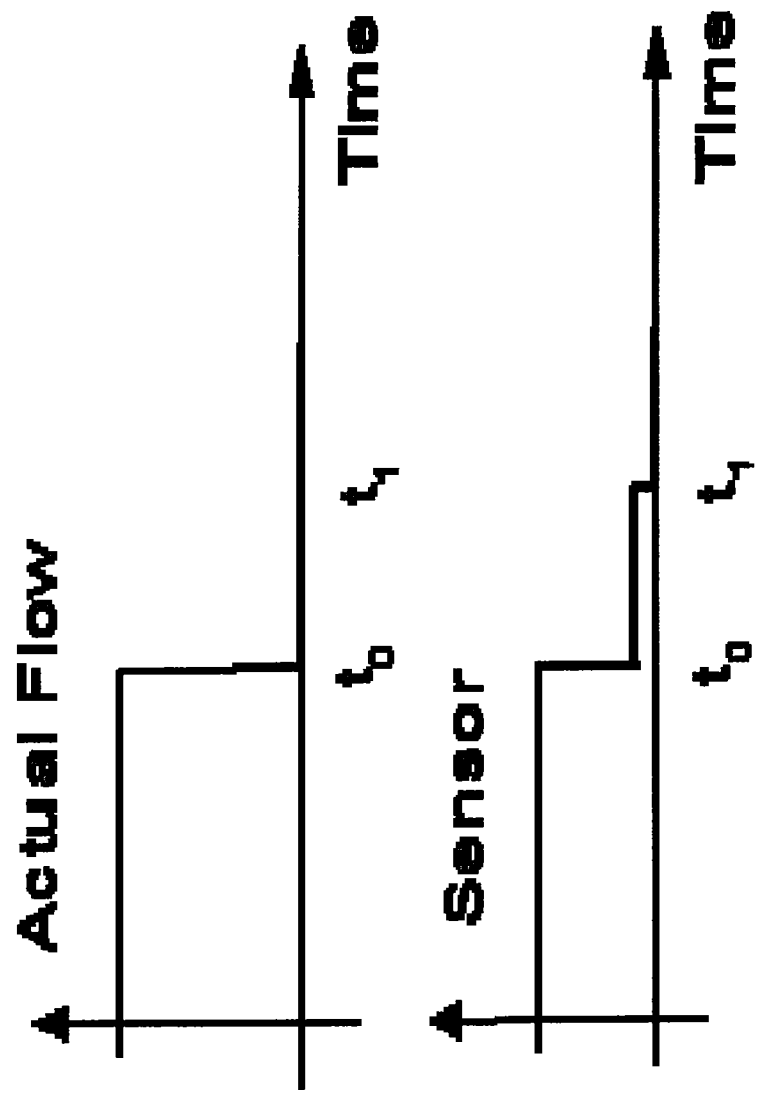
FIG. 12 illustrates a graph depicting a sensor with an existing positive offset.
Figure 13:
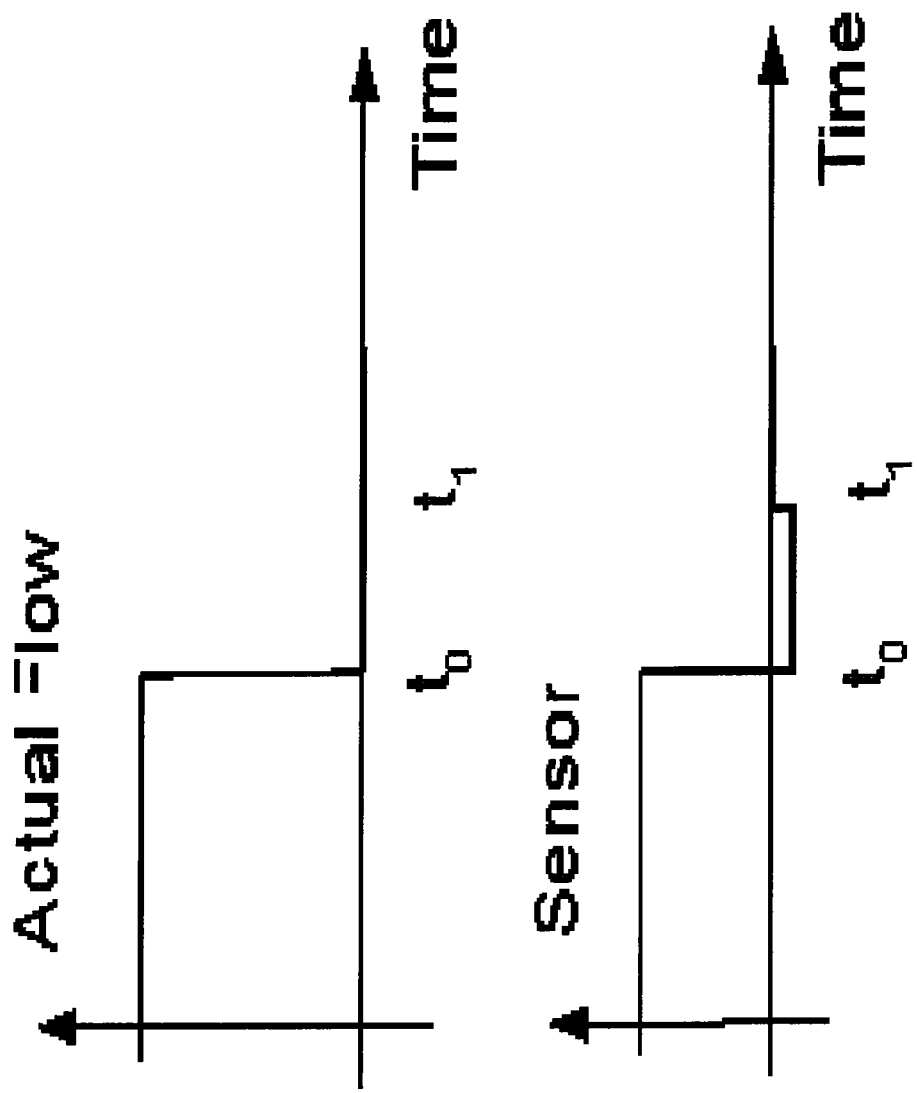
FIG. 13 illustrates a graph depicting a sensor with an existing negative zero offset.

FIG. 12 illustrates a graph depicting a sensor with an existing positive offset (either from drift over time or a previous incorrect zero). At instant t1, the device is zeroed and the offset is corrected, the device now shows zero output at zero flow. Similarly, FIG. 13 illustrates a graph depicting a sensor with an existing negative zero offset.

Figure 14:
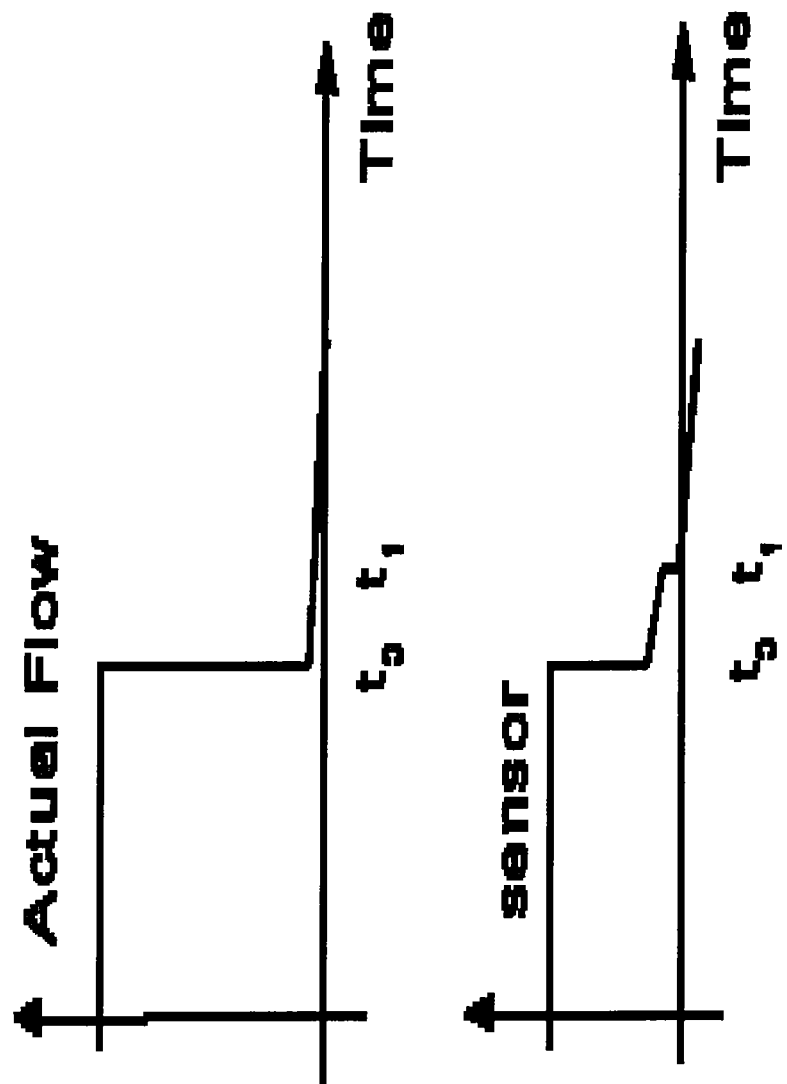
FIG. 14 illustrates a graph depicting a sensor correctly reflecting the actual flow after the valve closed when there valve leak.
Figure 15:
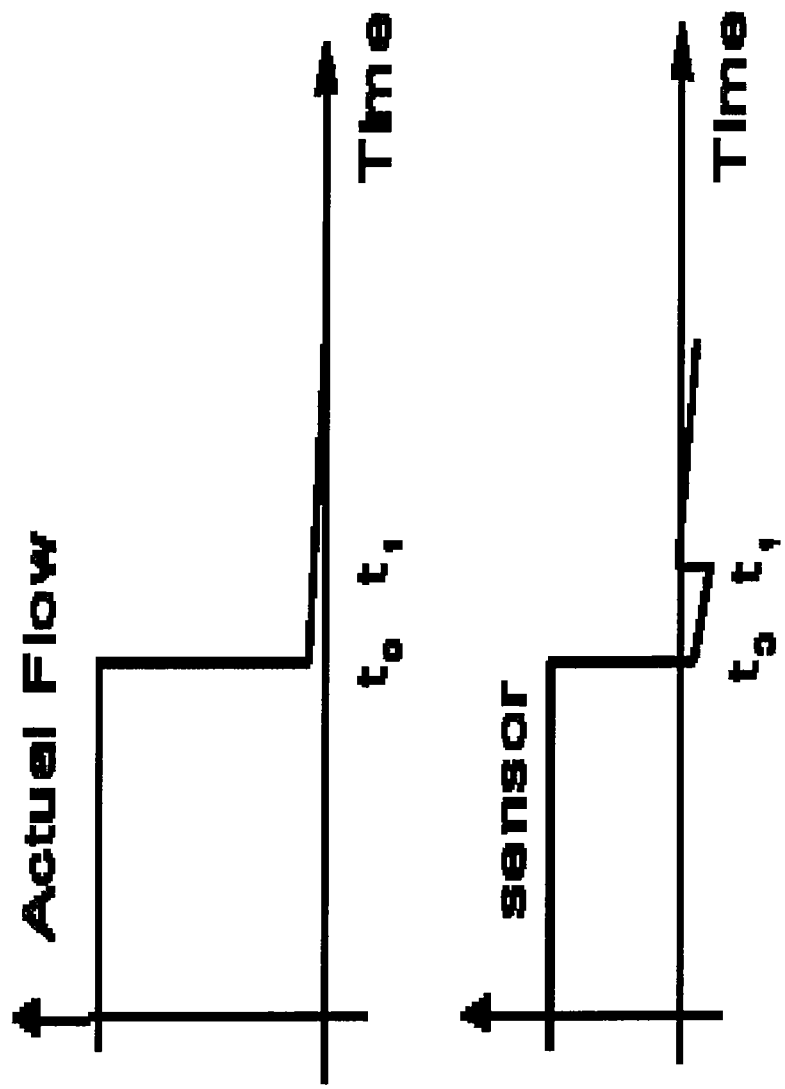
FIG. 15 illustrates a graph depicting partial correction of the sensor.
Figure 16:
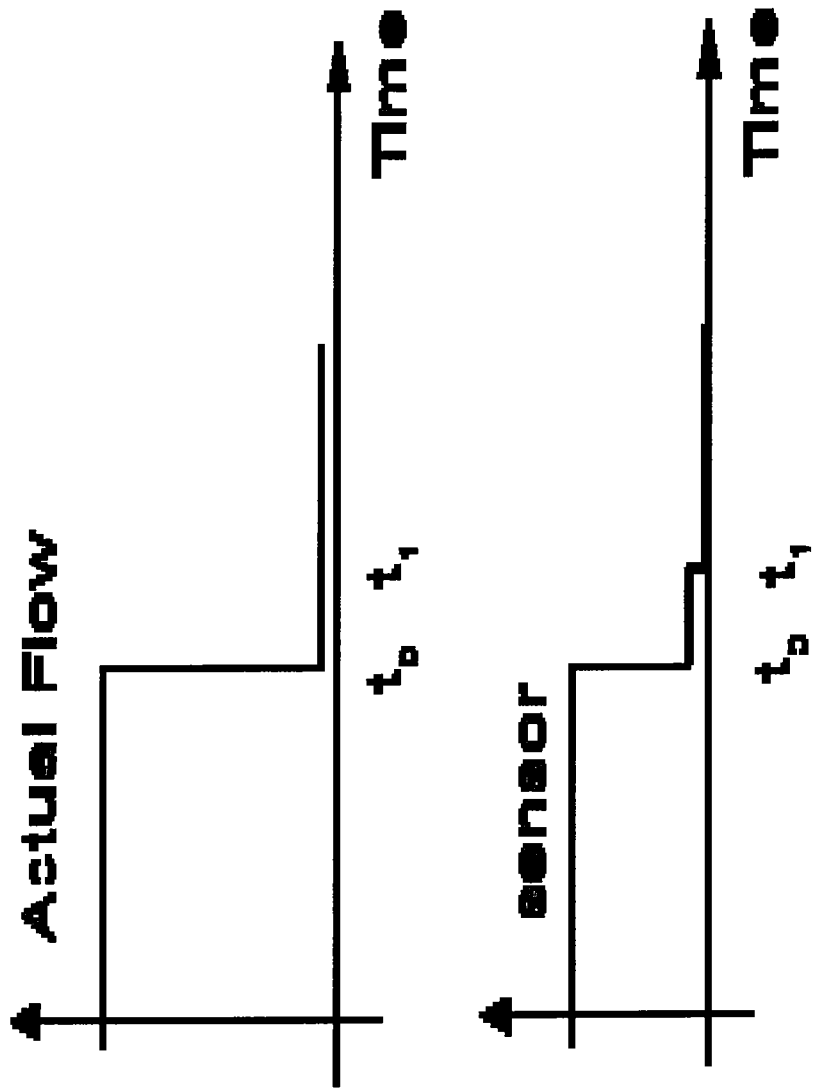
FIG. 16 illustrates a graph depicting zero output while a mass flow controller is actually leaking a constant flow.

FIG. 14 illustrates a graph depicting the sensor correctly reflecting the actual flow after the valve closed, but is leaking. When the device is zeroed at instant t1, the sensor is zeroed with actual flow. By the time the actual flow stops when the gas is depleted, the sensor now has a negative offset. FIG. 15 illustrates that if the sensor already had an offset, zeroing at instant t1 will partially correct it, but the same problem as in FIG. 14 still exists. FIG. 16 illustrates that if the leak is constant, the sensor is zeroed at instant t1 and now shows a zero output while the device is actually leaking a constant flow.

Accordingly, one aspect of the disclosed embodiments is to use the above described self-validating rate of decay implementations and configure a mass flow controller to make a flow measurement at the time of making the zero adjustment. Doing so enables the valve leak to be measured independently of the sensor. The mass flow controller can then calculate the sensor offset as:

Inherent sensor_offset=calculated flow−last zero correction−valve leak from the ROD measurement (Equation 2)

The valve leak rate can be determined from a rate of decay (ROD) measurement via the Ideal Gas Law. Per the Ideal Gas Law (with compressibility applied), the mass in a given volume is:

$n=PV/ZRT$ (Equation 3)

Where:
P is pressure
V is volume
n is the molar mass (or number of moles)
Z is compressibility
R is the universal gas constant
T is absolute temperature In this equation, the pressure, the compressibility (Z), and the temperature can change over time. Grouping constant terms and terms that change over time results in $n=[P/ZT]*[V/R]$ (Equation 4)

Taking the derivative of the molar mass n with respect to time results in the mass flow rate:

$dn/dt=d[P/ZT]/dt*[V/R]$ (Equation 5)

where:
P/ZT=Fmdvmg=mass of gas in inventory volume (see teachings of commonly owned U.S. Pat. No. 7,905,139, entitled "Mass flow controller with Improved Dynamic," which is hereby incorporated by reference)

Substitution of fmDvMg into Equation 5 and taking the time derivative of both sides results in:

$$Q_{ROD} = \frac{dfmDvMg}{dt} * ConvConst$$ (Equation 6)

where:
$Q_{rod}$=the gas volumetric flow rate at standard density (the density of an equivalent ideal gas at standard temperature and pressure) in accordance with SEMI Specification E12-96. As $Q_{rod}$ has been referenced to a standard density, it is also commonly referred to as a mass flow rate in standard flow units, e.g., sccm.

ConvConst=Conversion Constant (V/R) that converts the measured rate of change of the mass in the inventory volume into a mass flow rate.

The fmDvMg signal is derived from the MFC's internal pressure transducer by dividing the measured pressure by the measured temperature and the computed compressibility. The ConvConst can be obtained through simple calculation when the volume is precisely known. When the volume is not known with sufficient precision, the ConvConst can be obtained by simply performing an ROD measurement at a known, constant MFC flow rate and then using Equation 6 to solve for the conversion constant.

When a valve leak measurement is initiated, the MFC controls the upstream valve and deliberately shuts off the gas source to the MFC at zero setpoint. If there is a valve leak, gas bleeds off the gas in inventory volume (gas between the upstream isolation valve and the MFC control valve). While in the process of depleting gas in inventory, the rate of change of mass of gas in inventory, fmDvMg, is measured over time. The rate of change of mass of gas in inventory multiplied by the flow conversion constant number results in the ROD measured valve leak that is used in Equation 2:

$$\text{ROD\_Valve\_Leak} = [dFmDvMg/dt]*\text{ConvConstt} \quad \text{(Equation 7)}$$

In addition, a new term sensor_offset_correction may be utilized such that $$\text{Sensor\_offset\_correction} = -\text{inherent sensor\_offset} \quad \text{(Equation 8)}$$

Modifying (Equation 1) using the above term (Equation 8), provides the following equation:

$$\text{calculated\_flow} = \text{sensor offset} + \text{last zero correction} + \text{valve leak measured by the sensor} - \text{sensor\_offset\_correction} \quad \text{(Equation 9)}$$

Thus, using the above calculations, the mass flow controller may be configured to determine the inherent sensor_offset (Equation 2) and sensor_offset_correction (Equation 8) every time the device goes back to a zero setpoint. Thus, the sensor offset can be corrected in real time. Once the device has a reliable knowledge of the zero, the mass flow controller can apply a similar correction to the span measurement while flowing.

In addition, the mass flow controller may be configured with a logging mechanism to log the value of the sensor_offset_correction as a function of time for troubleshooting, maintenance or alarm applications.

In another application, the leak measurement can be used to measure leak along a gas path on the tool other than the MFC control valve. For example the upstream and downstream isolation valves could be checked for leak using the same principle described above just by changing the sequencing and status of the isolation valves and MFC control valve.

Additionally, in certain embodiments, the measurement could be improved if the status of the isolation valve downstream is known. For instance, in one embodiment, the mass flow controller may be configured through use of a software protocol to request (or be provided) with the status of the isolation valve downstream from the tool/tool controller. In another embodiment, the mass flow controller may be configured to determine the status of the isolation valve downstream by looking at other parameters such as, but not limited to, the final value of the inlet pressure at the end of the valve leak measurement or from the shape of the curve of the pressure decay.

Still, while the above described real-time zero adjustment describes the use of the disclosed methods and apparatus for providing a self-validating mass flow controllers, the scope of the claims are intended to cover other methods and apparatus that may be used for performing the rate of decay measurement for performing the real-time zero adjustment as described above. For instance, as an alternative embodiment, the mass flow controller may be programmed with configuration parameters to simply assume, without communicating with a tool controller or having a means for closing the isolation valve, that the isolation valve is closed for performing a rate of decay measurement. For example, the configuration parameters may include parameters that assume that the isolation valve is closed after a certain amount of time after zero setup or a certain amount of time before receiving a non-zero setup.

Accordingly, as described above, advantages of the disclosed embodiments include, but are not limited to, a system and method for providing a self-validating mass flow controller that eliminates the requirement of having a separate device installed on the tool to perform a rate of decay measurement for checking valve leak. In addition, the disclosed embodiments include a system and method for providing a self-validating mass flow controller that is configured to determine valve leak and sensor offset simultaneously for real time in-situ correction of a mass flow controller's output for zero offset or zero drift in the presence of valve leak. This will enable the MFC to provide real time accurate information without requiring down time to make the measurements.

Furthermore, the disclosed embodiments enable rate of decay measurements to be performed inside of the MFC, with no changes to the existing tool software. This would require no added cost or complexity to the customer because the disclosed modification to the device is backward compatible with existing tool installations. Still, as illustrated in FIGS. 6-8, the disclosed embodiments fit within the footprint/structure of existing mass flow controllers, thus reducing the cost of implementation and maintaining compatibility with current tool configurations. Additionally, the disclosed embodiments would add new diagnostic capabilities to older tools without any requiring any software or hardware modifications (other than perhaps additional wiring) to an existing tool. Moreover, the disclosed embodiments utilizes the existing components on a gas stick (i.e., components along the gas delivery line, such as, but not limited to, the upstream isolation valve), thereby further decreasing cost and maintaining compatibility with existing tools. As an additional benefit, using the upstream isolation valve on the gas stick to stop the flow of gas instead of embedding a dedicated isolation valve in the mass flow controller reduces cost and provides the mass flow controller with more internal volume.

In addition, a benefit in having the mass flow controller control the isolation valve is that the mass flow controller control system operates extremely fast and can make critical calculations and logic decisions that the tool controller would not be able to make within the necessary time constraints. Additionally, because the mass flow controller would be configured by the mass flow controller providers instead of by the operators of the tool, the mass flow controller providers are able to ensure that the mass flow controller is not put in a condition where it would lose control. For example, the mass flow controller would be configured to know the magnitude of the change in pressure that it can tolerate, how big a pressure drop it needs to take an accurate measurement for a given flow rate and inlet pressure, and how long it needs to take an accurate measurement. Additionally, as stated above, the mass flow controller can be configured to make intelligent decisions on when it can take a ft) measurement and can quickly abort a measurement based on a command from a user such as a change in set point or a command to shut off the tool.

A number of parameters can be programmed to set limits on the measurement and the results. For example the device could be programmed to make a measurement continuously or automatically every 5 seconds, or 5 minutes, or 5 hours or any other time interval. It could also be programmed to make measurement only at certain setpoints, or only once after each setpoint changes, etc. The mass flow controller could also be configured to not start a rate of decay measurement unless it determines that there is enough time to complete the measurement. The device could also have a number of different measurement modes. For example, a "quick" measurement with lower resolution could be performed often and averaged, while a "maintenance" high resolution mode could be performed during daily maintenance checks that are performed on the tool routinely.

Other parameters may be configured to control the duration of the rate of decay measurement, i.e., how long the upstream valve is set to close to force a pressure decay. For example, this can be controlled by either having a time limit to the measurement or a maximum pressure drop allowed. Limiting either one or both allows measurements to be performed when the process time is limited, such as setpoints that only lasts a few seconds, or to limit the potential perturbations to the flow when the pressure is restored.

The mass flow controllers may also be fitted with extra flash memory to allow for data logging and trending of the various measurements performed inside the mass flow controller, along with time stamps, such as but not limited to the rate of decay measurements, the changes in flow characteristics over time, the changes in device offset and leak through the valve or the tool, maximum pressures and temperatures seen been the device, the requests for zero routines, etc.

While the above described figures discloses various embodiments of a mass flow controller, one of ordinary skill in the art would recognize that the above disclosed modifications may similarly be made to a mass flow meter for enabling a self-validating mass flow meter for providing real time in-situ correction of a mass flow meter's output to account for zero offset or zero drift. The primary difference between the disclosed mass flow controllers and a mass flow meter is that the mass flow meter does not include a controller that operates to adjust the valve to achieve a desired flow rate as is the case with a mass flow controller. The scope of the appended claims is intended to cover mass flow meters as well as mass flow controllers and any other similar flow measuring/controlling devices.

While specific details about the above embodiments have been described, the above hardware and software descriptions are intended merely as example embodiments and are not intended to limit the structure or implementation of the disclosed embodiments.

In addition, as outlined above, certain aspects of the disclosed embodiments may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Those skilled in the art will recognize that the present teachings are amenable to a variety of modifications and/or enhancements. While the foregoing has described what is considered to be the best mode and/or other examples, it is understood that various modifications may be made therein and that the subject matter disclosed herein may be implemented in various forms and examples, and that the teachings may be applied in numerous applications, only some of which have been described herein. Such modifications are intended to be covered within the true scope of the present teachings.

In addition, the flowcharts, sequence diagrams, and block diagrams in the figures illustrate the architecture, functionality, and operation of possible implementations of systems, methods and computer program products according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated. The scope of the claims is intended to broadly cover the disclosed embodiments and any such modification.

The invention claimed is:

1. An apparatus comprising:
an inlet for receiving fluid;
a flow path in which the fluid passes through;
a mass flow sensor for providing a signal corresponding to mass flow of the fluid through the flow path;
a pressure transducer coupled to the flow path configured to measure pressure at a point in the flow path;
a communication interface for communicating with a tool controller; and
at least one processing component configured to execute instructions to:
perform an in-situ rate of decay measurement during a time interval that avoids interrupting operation of the apparatus;
determine a first valve leak value based on the rate of decay measurement;
perform a flow measurement using the mass flow sensor while performing the in-situ rate of decay measurement;
determine a second valve leak value measured by the mass flow sensor;
determine a sensor offset correction value based on a difference between the first valve leak value and the second valve leak value; and apply the sensor offset correction value in zeroing the flow sensor.

2. The apparatus of claim 1, wherein the at least one processing component is further configured to execute instructions to log a value of the sensor offset correction value as a function of time for troubleshooting, performing trending analysis, maintenance, and alarm applications.

3. The apparatus of claim 1, wherein the at least one processing component is further configured to execute instructions to re-execute the instructions of claim 1 every time the apparatus goes back to a zero setpoint.

4. The apparatus of claim 2, wherein the at least one processing component is further configured to execute instructions to utilize data from the trending analysis to determine a trending sensor offset correction value and apply the determined trending sensor offset correction value to a span measurement while flowing.

5. The apparatus of claim 1, wherein the at least one processing component is further configured to execute instructions to implement a software protocol for communicating with a tool controller for requesting that that the tool controller close an upstream isolation valve prior to performing the in-situ rate of decay measurement.

6. The apparatus of claim 5, wherein the at least one processing component is further configured to execute instructions to receive process timing information from the tool controller, and identify from the process timing information the time interval in which the in-situ rate of decay measurement may be completed without interruption.

7. The apparatus of claim 1, further comprising an internal valve configured to receive a first pneumatic line coupled to a tool pilot valve, the internal valve further configured to couple a second pneumatic line from the internal valve to an external isolation valve upstream of the inlet, and wherein the at least one processing component is further configured to execute instructions to close the external isolation valve by using the internal valve to block airflow being received through the first pneumatic line prior to performing the in-situ rate of decay measurement.

8. The apparatus of claim 1, further comprising an electrical relay configured to be coupled between a first electrical line from a tool controller and a second electrical line to a tool pilot valve, and wherein the at least one processing component is further configured to execute instructions to close an external isolation valve by sending a close valve signal to the tool pilot valve via the second electrical line prior to performing the in-situ rate of decay measurement.

9. The apparatus of claim 1, further comprising an electrical relay configured to be coupled to an external isolation valve, and wherein the at least one processing component is further configured to execute instructions to close the external isolation valve by sending a close valve signal to the external isolation valve prior to performing the in-situ rate of decay measurement.

10. The apparatus of claim 1, wherein the at least one processing component is further configured to execute instructions to notify a tool controller of a result of the in-situ rate of decay measurement.

11. The apparatus of claim 1, wherein the at least one processing component is further configured to execute instructions to raise an alarm when the rate of decay measurement shows that characteristics of the apparatus have changed by a certain amount in a given period of time.

12. A self-validating method performed in-situ by an apparatus for the real time correction of a sensed flow measurement to account for zero drift in the presence of valve leak, the method comprising:
performing an in-situ rate of decay measurement during a time interval that avoids interrupting operation of the apparatus;
determining, using a processor, a first valve leak value based on the rate of decay measurement;
performing a flow measurement using a flow sensor while performing the in-situ rate of decay measurement;
determining a second valve leak value measured by the flow sensor;
determining a sensor offset correction value based on a difference between the first valve leak value and the second valve leak value; and
applying the sensor offset correction value in zeroing the flow sensor.

13. The method of claim 12, further comprising logging a value of the sensor offset correction value as a function of time.

14. The method of claim 12, further comprising requesting a tool controller to close an upstream isolation valve.

15. The method of claim 12, further comprising repeating the steps of claim 12 every time the apparatus goes back to a zero setpoint.

16. The method of claim 12, further comprising logging a value of the sensor offset correction value as a function of time, performing trending analysis on logged data, determining a trending sensor offset correction value, and applying the determined trending sensor offset correction value to a span measurement while flowing.

17. The method of claim 12, further comprising identifying from process timing information the time interval in which the in-situ rate of decay measurement may be completed without interruption.

18. The method of claim 12, further comprising assuming, based on configuration parameters, that an upstream isolation valve is closed prior to performing the in-situ rate of decay measurement.

19. The method of claim 12, further comprising closing an upstream isolation valve using an internal valve of the apparatus.

20. The method of claim 12, further comprising closing an upstream isolation valve by sending a close valve signal to a tool pilot valve.

* * * * *